(12) United States Patent
Singh et al.

(10) Patent No.: US 7,719,520 B2
(45) Date of Patent: May 18, 2010

(54) SYSTEMS AND METHODS FOR PROCESSING DATA ENTERED USING AN EYE-TRACKING SYSTEM

(75) Inventors: Mona Singh, Cary, NC (US); Theodosios Thomas, Apex, NC (US)

(73) Assignee: Scenera Technologies, LLC, Portsmouth, NH (US)

( * ) Notice: Subject to any disclaimer, the term of this patent is extended or adjusted under 35 U.S.C. 154(b) by 1295 days.

(21) Appl. No.: 11/206,596

(22) Filed: Aug. 18, 2005

(65) Prior Publication Data

US 2007/0040799 A1 Feb. 22, 2007

(51) Int. Cl.
*G09G 5/00* (2006.01)
(52) U.S. Cl. .................................. 345/169; 345/175
(58) Field of Classification Search ................. 345/168, 345/169, 175
See application file for complete search history.

(56) References Cited

U.S. PATENT DOCUMENTS

| | | | | |
|---|---|---|---|---|
| 5,528,235 | A * | 6/1996 | Lin et al. ...................... | 341/22 |
| 5,818,437 | A | 10/1998 | Grover et al. ................ | 715/811 |
| 5,844,544 | A * | 12/1998 | Kahn et al. .................. | 345/156 |
| 5,912,721 | A | 6/1999 | Yamaguchi et al. ......... | 351/210 |
| 6,127,990 | A * | 10/2000 | Zwern .......................... | 345/8 |
| 6,286,064 | B1 | 9/2001 | King et al. ................... | 710/67 |
| 6,307,548 | B1 | 10/2001 | Flinchem et al. ............ | 715/811 |
| 6,377,685 | B1 | 4/2002 | Krishnan ............... | 379/433.07 |
| 6,847,706 | B2 | 1/2005 | Bozorgui-Nesbat ...... | 379/93.27 |
| 6,886,137 | B2 | 4/2005 | Peck et al. ................... | 715/785 |
| 7,286,115 | B2 * | 10/2007 | Longe et al. ................ | 345/168 |
| 2002/0126097 | A1 | 9/2002 | Savolainen | |
| 2002/0163504 | A1 | 11/2002 | Pallakoff .................... | 345/169 |
| 2003/0011574 | A1 | 1/2003 | Goodman .................... | 345/172 |
| 2003/0095104 | A1 | 5/2003 | Kandogan et al. ........... | 345/168 |
| 2004/0075645 | A1 | 4/2004 | Taylor et al. ................ | 345/157 |
| 2004/0174496 | A1 * | 9/2004 | Ji et al. ........................ | 351/209 |
| 2004/0198249 | A1 | 10/2004 | Griffin ........................ | 455/90.3 |
| 2005/0047629 | A1 | 3/2005 | Farrell et al. ................ | 382/117 |
| 2005/0134572 | A1 | 6/2005 | Anson ......................... | 345/169 |
| 2005/0200609 | A1 * | 9/2005 | Van der Hoeven .......... | 345/169 |
| 2007/0146637 | A1 * | 6/2007 | Johnson et al. ............. | 351/226 |

FOREIGN PATENT DOCUMENTS

WO    WO 2004/090704    10/2004

* cited by examiner

*Primary Examiner*—Amr Awad
*Assistant Examiner*—Tony Davis

(57) ABSTRACT

A method for processing data entered using an electronic device and an electronic device capable of implementing the method is described. In one embodiment, the electronic device includes at least one multi-value key associated with at least two input data values. Each multi-value key includes a plurality of units and each input data value corresponds to at least one unit. The electronic device also includes an eye-tracking system that determines an area where a user is gazing by monitoring eye movements of the user, and an input value selection module coupled to the plurality of units and to the eye-tracking system. The input value selection module determines probabilistically which input data value was entered based on a value received from at least one unit and on the area where the user is gazing.

23 Claims, 5 Drawing Sheets

| | Input Key 20 |
|  | Gaze Area 14 |
| • | Focal point 16 |

SYSTEMS AND METHODS FOR PROCESSING DATA ENTERED USING AN EYE-TRACKING SYSTEM

FIELD OF THE INVENTION

The present invention relates to electronic devices, and more particularly to a system for processing data entered at an electronic device.

BACKGROUND

Handheld electronic devices, such as mobile phones, cameras and personal digital assistants (PDAs), offer a multitude of services and functions. For example, with the development of wireless technologies, many handheld devices are capable of connecting a user to a wireless network, such as the Internet, and allowing the user to send and receive information to and from other users via the wireless network. Moreover, many handheld devices can load and run software applications that allow the user to perform computing tasks.

While handheld devices can offer performance and versatility, the available services can sometimes be awkward to use because of device's size. Of particular concern is data entry, e.g., inputting text for an electronic message. Most handheld devices lack the space to provide a full keyboard for entering data and instead utilize several known techniques to allow the user to create words or number patterns. Nevertheless, each technique has its disadvantages.

For example, mobile phones typically provide a conventional number-key pad where each number key, i.e., key 2-9, is associated with three to four alphanumeric characters. By pressing specific keys, the user can form words. One method for creating words using the number-key pad uses a prediction algorithm that relies on an electronic dictionary of common words to predict a word based on the key(s) pressed. This technique, referred to as the T-9 technique, allows the user to tap a key, and a input value selection module in the device checks the dictionary to resolve ambiguities between the letters associated with the tapped key. Although the T-9 technique is a single-tap method that can allow fast data entry, it is not intuitive and can be deficient when two or more words are formed by the same sequence of tapped keys. In that instance, the T-9 technique cannot disambiguate between the words themselves and the user must resolve the ambiguity.

Another word forming technique using the number-key pad is referred to as multi-tapping. In multi-tapping, the user enters a particular letter by pressing the number key associated with the letter at least one time to scroll to the desired letter. Once the desired letter is found, e.g., displayed on the screen, the user must wait until the selection is committed and the letter is inputted before proceeding to the next letter. While multi-tapping allows the user to form words without ambiguity, it is time-consuming and awkward.

Other handheld devices, such as PDAs, can display a full keyboard on a touch screen, and the user selects letters by touching or tapping on the touch screen with a stylus. In other similar devices, a full miniature keyboard is provided in the device itself. In both instances, the size of the displayed and physical keyboard is reduced to accommodate the space limitations. Because the keys are small, they are difficult to see or press, making text entry awkward and slow as well as error prone.

Other text entry techniques exist but suffer from the same and other shortcomings described above. Most of these techniques, in addition to being awkward and slow, are not intuitive and/or require the user to spend much time practicing in order to become somewhat proficient.

SUMMARY

The present invention provides a method and system for entering data using an eye-tracking system in combination with a plurality of manually activated keys. In one embodiment, an electronic device includes at least one multi-value key associated with at least two input data values. Each multi-value key includes a plurality of units and each input data value corresponds to at least one unit. The electronic device also includes an eye-tracking system that determines an area where a user is gazing by monitoring eye movements of the user, and an input value selection module coupled to the plurality of units and to the eye-tracking system. The input value selection module determines probabilistically which input data value was entered based on a value received from at least one unit and on the area where the user is gazing.

In another embodiment, the electronic device includes a plurality of data input keys. Each input key is associated with at least one input data value and at least one data input key is a multi-value key associated with at least two input data values. The electronic device also includes an eye-tracking system that determines an area where a user is gazing by monitoring eye movements of the user and that determines an area covering portions of at least two data input keys, at least one of which is a multi-value key. The electronic device also includes an input value selection module coupled to the plurality of data input keys and to the eye-tracking system that determines which input data value was entered based on a manually pressed data input key and on the area where the user is gazing.

In another embodiment, a method for processing data entered at an electronic device having at least one multi-value key associated with at least two input data values includes assigning a plurality of units to each multi-value key, where each input data value corresponds to at least one unit, determining an area where a user is gazing by tracking the user's eye movement, detecting a manual selection of a multi-value key, and determining probabilistically which input data value was entered based on a value received from at least one unit and on the area where the user is gazing.

In another embodiment, a method for processing data entered at an electronic device having a plurality of data input keys, where each data input key is associated with at least one input data value and at least one data input key is a multi-value key associated with at least two input data values, includes determining an area where a user is gazing by tracking the user's eye movement, where the area covers portions of at least two data input keys, at least one of which is a multi-value key, detecting a manual selection of a data input key, and determining which input data value was entered based on the manually pressed data input key and on the area where the user is gazing.

DESCRIPTION OF SEVERAL VIEWS OF THE DRAWINGS

The various features of the present invention and the manner of attaining them will be described in greater detail with reference to the following description, claims and drawings, wherein reference numerals are reused, where appropriate, to indicate a correspondence between the referenced items, and wherein:

DETAILED DESCRIPTION

The present invention relates to electronic devices, and more particularly to methods and systems for processing data entered at an electronic device. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

According to one embodiment, an eye-gaze or eye-tracking system is incorporated into an electronic device that has data input keys that are associated with two or more input values. The electronic device uses the eye-tracking system to determine where a user is gazing while the user presses a data input key. Based on the eye-tracking and key press data, the electronic device is able to determine which of the two or more input values associated with the pressed key was entered.

Figure 1A:
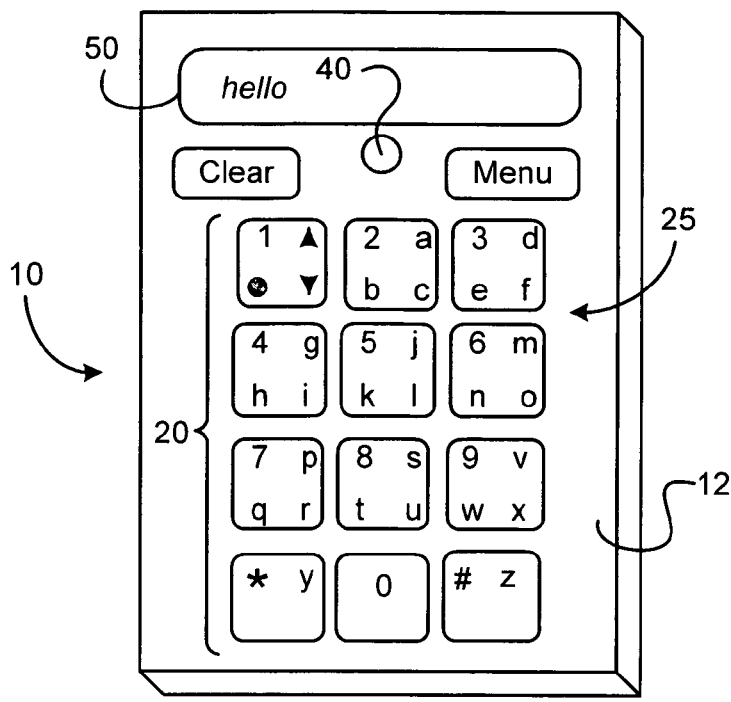
FIG. 1A is a schematic diagram of an exemplary electronic device according to an embodiment.
Figure 1B:
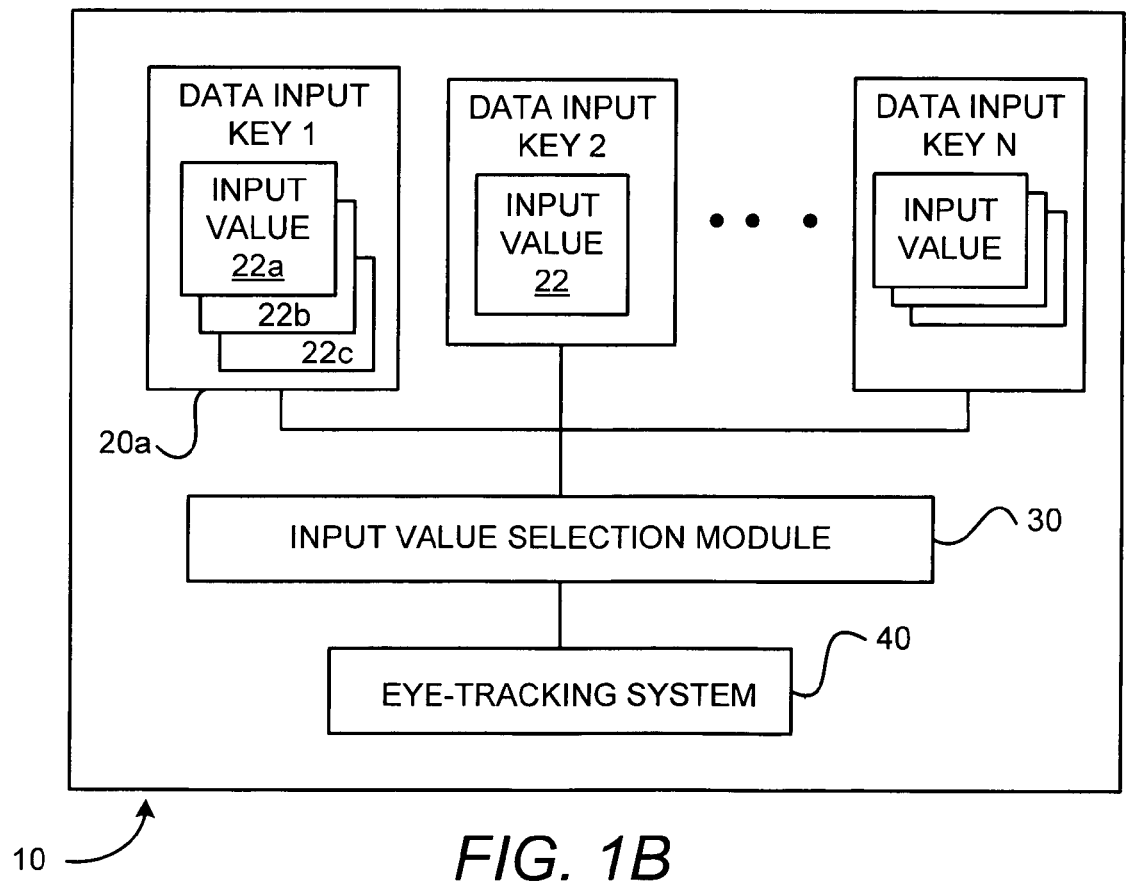
FIG. 1B is a system block diagram of the electronic device according to an embodiment.

FIG. 1A is a schematic diagram of an exemplary electronic device according to an embodiment and FIG. 1B is a system block diagram of the electronic device according to another embodiment. Referring to FIGS. 1A and 1B, the electronic device 10 includes a plurality of data input keys 20, an eye-tracking system 40, an input value selection module 30, and a display screen 50. The data input keys 20 can be arranged in rows and columns to form a keypad 25 on a face 12 of the electronic device 10. Each data input key 20 is associated with at least one input value 22, and at least one of the data input keys is a multi-value key 20a that is associated with at least two data input values 22a, 22b, 22c.

In a preferred embodiment, the eye-tracking system 40 is located on the same face 12 of the electronic device as the keypad 25. The eye-tracking system 40 tracks and records the movement of a user's eye(s) to determine an area where the user is gazing. The eye-tracking system 40 can use many different known techniques to monitor and track the user's eye movements. For example, the eye-tracking system 40 can utilize a technique known as corneal reflection, which directs an infrared light beam at the user's eye and measures the angular difference between the operator's mobile pupil and the stationary light beam reflection. Alternatively, the eye-tracking system 40 can scan the user's eye region with a scanning apparatus, e.g., television camera, and analyze the resulting image. Commercially available eye-tracking systems 40 that can be appropriate for the present invention include, for example, the QUICK GLANCE product developed by EyeTech Digital Systems of Mesa, Ariz.

In order to enter an input value, particularly one that is associated with a multi-value key 20a, e.g., 22a, the user locates the key 20a with which the input value 22a is associated and gazes at or near a corresponding representation of input value 22a on the face of the key while pressing the key 20a. The input value selection module 30 receives the eye-tracking data as well as the data related to the selected, e.g., manually pressed, key 20a, and analyzes the received data to determine which input value 22a was entered. The entered value 22a is then preferably displayed on a screen 50.

In one embodiment, the accuracy with which the input value selection module 30 can determine the input value 22a is improved by dividing each multi-value key 20a into a plurality of units and associating each of the input values 22a-22c with at least one of the units. In a preferred embodiment, a representation of each input value is provided on a portion of the multi-value key that coincides with the associated unit(s). Each unit, in turn is associated with at least one pressure sensor that is capable of measuring a pressure asserted on the associated unit.

Figure 2A:
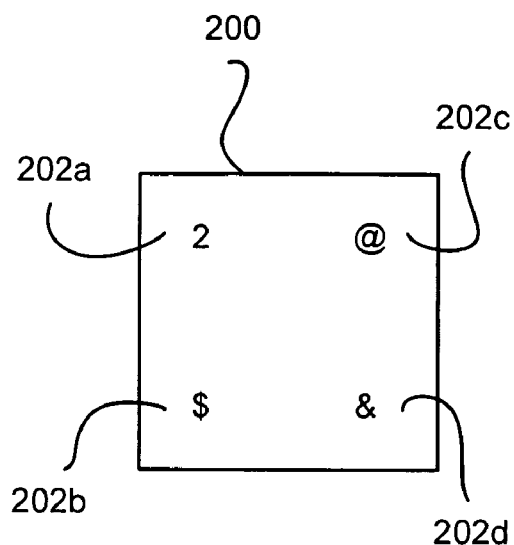
FIGS. 2A, 2B and 2C illustrate an exemplary multi-value key that is associated with four (4) input values according to an embodiment.
Figure 2B:
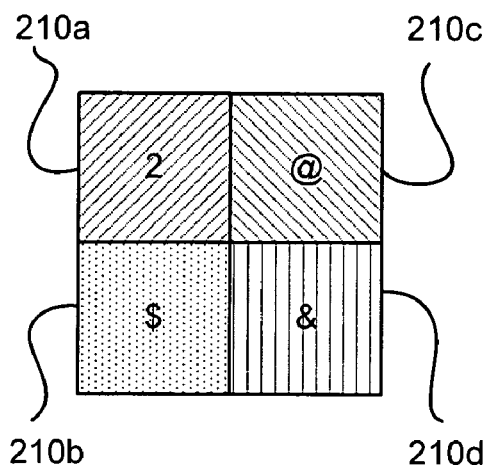

FIG. 2A is an illustration of an exemplary multi-value key 200 that is associated with four (4) input values 202a-202d. As is shown in FIG. 2B, the multi-value key 200 is divided into four (4) units 210a-210d and each of the input values 202a-202d is associated with one of the four units 210a-210d. In FIG. 2B, the multi-value key 200 is divided into four (4) substantially equal units 210a-210d merely for the sake of clarity. The number of units can be greater than four (4) and, in such circumstances, each input value, e.g., 202a, can be associated with more than one unit 210a. Similarly, the shape and size of each unit 210 can vary so long as each input value 202a-202d is associated with at least one unit 210.

Figure 2C:
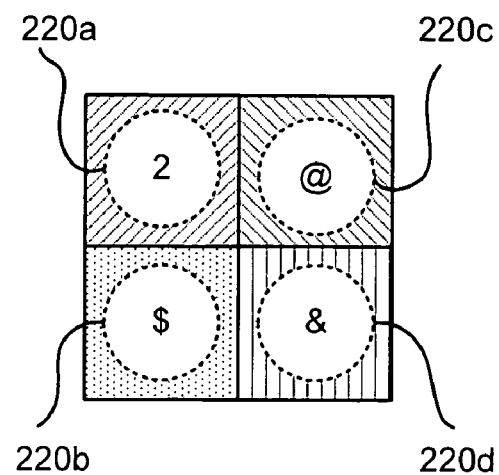

As is shown in FIG. 2C, each unit 210a-210d may be associated with a pressure sensor 220a-220d that is capable of quantifying the amount of pressure asserted on the associated unit 210a-210d. Although not shown in FIG. 2C, each unit, e.g., 210a, can be associated with more than one pressure sensor 220a, and the shape and size of the pressure sensors 220a-220d can vary.

According to this embodiment, during data entry, the user can press the portion of the multi-value key on which the desired input value, e.g., 202a, is provided, while gazing at the desired input value 202a. Each pressure sensor 220a-220d measures the pressure asserted on its associated unit 210a-210d. The input value selection module 30 receives the pressure measurements from each of the pressure sensors 220a-220d along with the eye-tracking information and determines which of the associated input values 202a-202d was entered.

Figure 3:
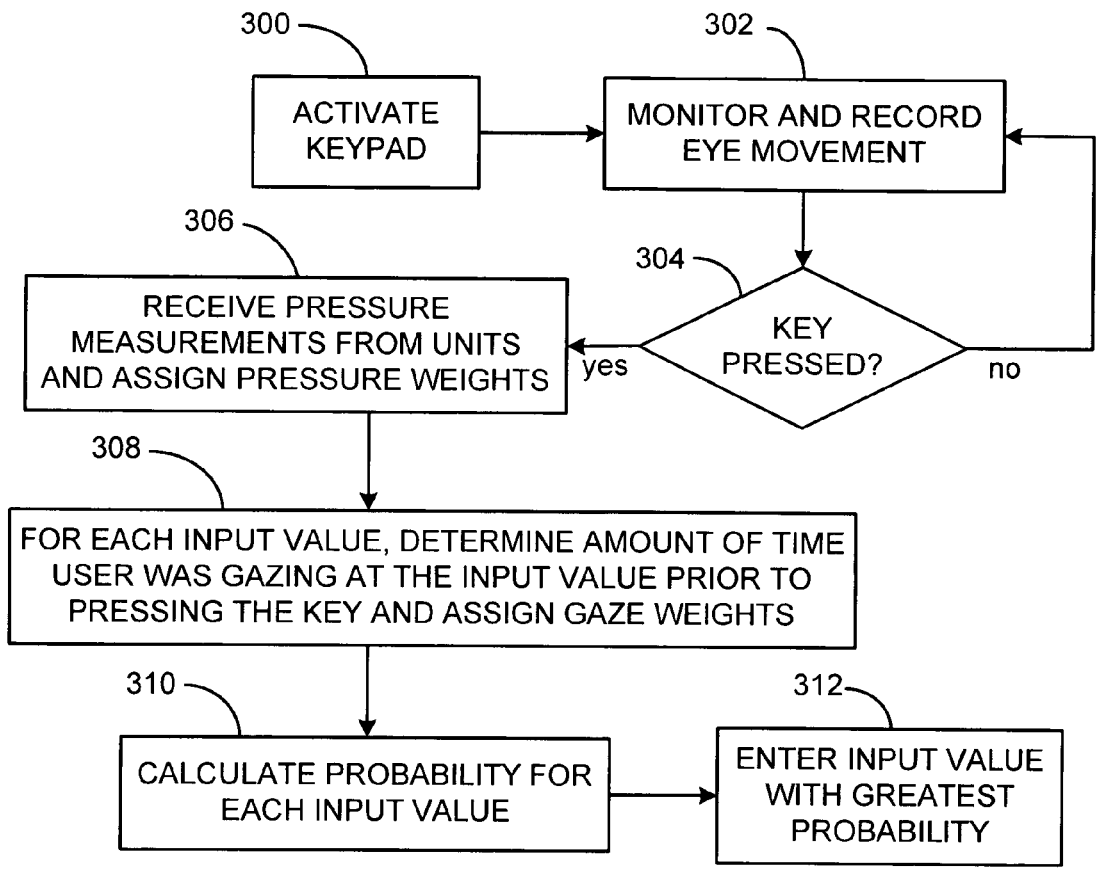
FIG. 3 is a flowchart illustrating a process for processing data entered at the electronic device according to an embodiment shown in FIGS. 1A, 1B, and 2A-2C.

FIG. 3 is a flowchart illustrating a process for processing data entered at the electronic device 10 shown in FIGS. 1 and 2. The process begins by activating the keypad 25 (step 300), for example, by unlocking the input keys 20. The activation of the keypad 25 can also activate the eye-tracking system 40, which then monitors and records the user's eye movements (step 302). Activation of the keypad 25 and/or eye-tracking system 40 does not necessarily require an additional action or input, but can occur automatically when electronic device 10 is powered up. According to a preferred embodiment, the eye-tracking system 40 monitors and records, among other things, an area where the user is gazing, which input value(s) are in the area, and the amount of time the user's gaze rests on the input value(s).

When the user presses a multi-value key 200 (step 304) to enter a desired input value, e.g., 202a, each pressure sensor 220a-220d measures the amount of pressure asserted on the associated unit 210a-210d. The pressure measurements associated with each unit 210a-210d are received by the input value selection module 30, which assigns to each input value 202a-202d a pressure weight, P, based on the corresponding pressure measurement(s) (step 306). In one embodiment, the pressure weight, P, can be a fraction ranging from zero (0), corresponding to the lowest pressure measurement, to one (1.0), corresponding to the highest pressure measurement.

Thus, in the example above where the user wants to enter input value "2" (202a), the user preferably presses at or near the upper left hand corner of the input key 200, which is the portion of the key on which the "2" is provided and which substantially coincides with the unit 210a associated with the input value 202a. The pressure sensors 220a-220d measure the pressure asserted on each of the units 210a-210d. Because the user presses the portion of the key 200 substantially coinciding with the unit 210a corresponding to the desired input value 202a, the pressure weight, P, assigned to that input value 202a will naturally be greater than the pressure weight assigned to an input value, e.g., 202d, associated with a portion of the key 200 that was not pressed directly.

In addition to processing the pressure measurements, the input value selection module 30 also analyzes the eye-tracking data to determine how long the user was gazing at any of the input values 202a-202d prior to pressing the key 200 and assigns a gaze weight, G, to each input value 202a-202d based on the amount of time the user was gazing at the input value 202a-202d (step 308). Like the pressure weight, P, the gaze weight, G, can be a fraction ranging from zero (0), corresponding to the least amount of gaze time, to one (1.0), corresponding to the greatest amount of gaze time. Once the pressure weight, P, and gaze weight, G, for each input value 202a-202d are assigned, the input value selection module 30 calculates a probability factor, PF, for each input value (step 310).

Figure 4:
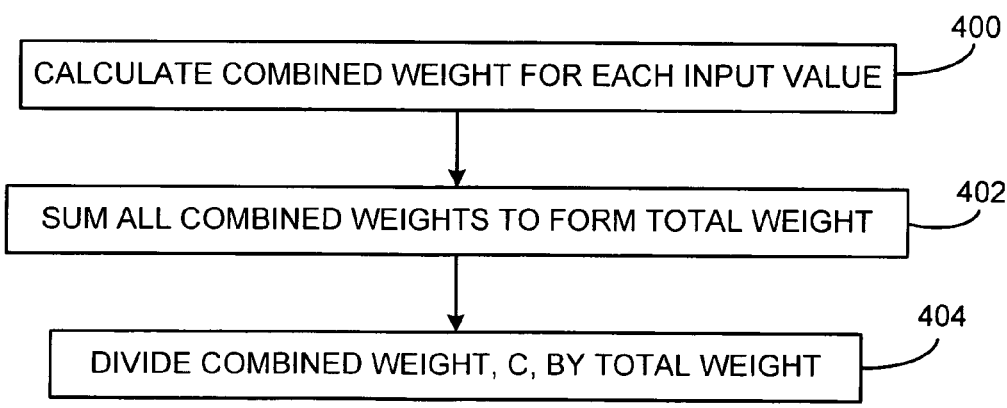
FIG. 4 is a flowchart illustrating a process for calculating the probability factor for an input value according to one embodiment.

FIG. 4 is a flowchart illustrating a process for calculating the probability factor for an input value, e.g., 202a, according to one embodiment. For each input value 202a-202d, the assigned pressure weight, P, and gaze weight, G, are added to form a combined weight, C (step 400). The combined weight, C, for each input value 202a-202d is summed to form a total weight, T (step 402). The probability factor, PF, for each input value 202a-202d is calculated by dividing the combined weight, C, of the input value 202a by the total weight, T (step 404). Thus, for an input value, i, the probability factor, PF(i) is determined by:

$$PF(i)=C(i)/T$$

Referring again to FIG. 3, after the probability factor for each of the input values 202a-202d is calculated (step 310), the input value selection module 30 selects the input value having the greatest probability factor and displays that input value (step 312).

Based on the embodiment described above, the methods and systems disclosed take advantage of how the user intuitively enters data. That is, the user searches the keypad 25 for the key 20 that includes the input value 22 the user desires to enter. When the user's gaze falls upon the desired input value 22, the user instinctively focuses on the input value 22 and presses the portion of the key 20 displaying the input value 22. The various components of the electronic device 10 according to this embodiment monitor these actions to allow the user to enter the desired input value. The user can enter the desired input value with a single tap and need not wait a prescribed time before entering another input value. Accordingly, this embodiment is easy to use and provides fast data entry.

Figure 5:
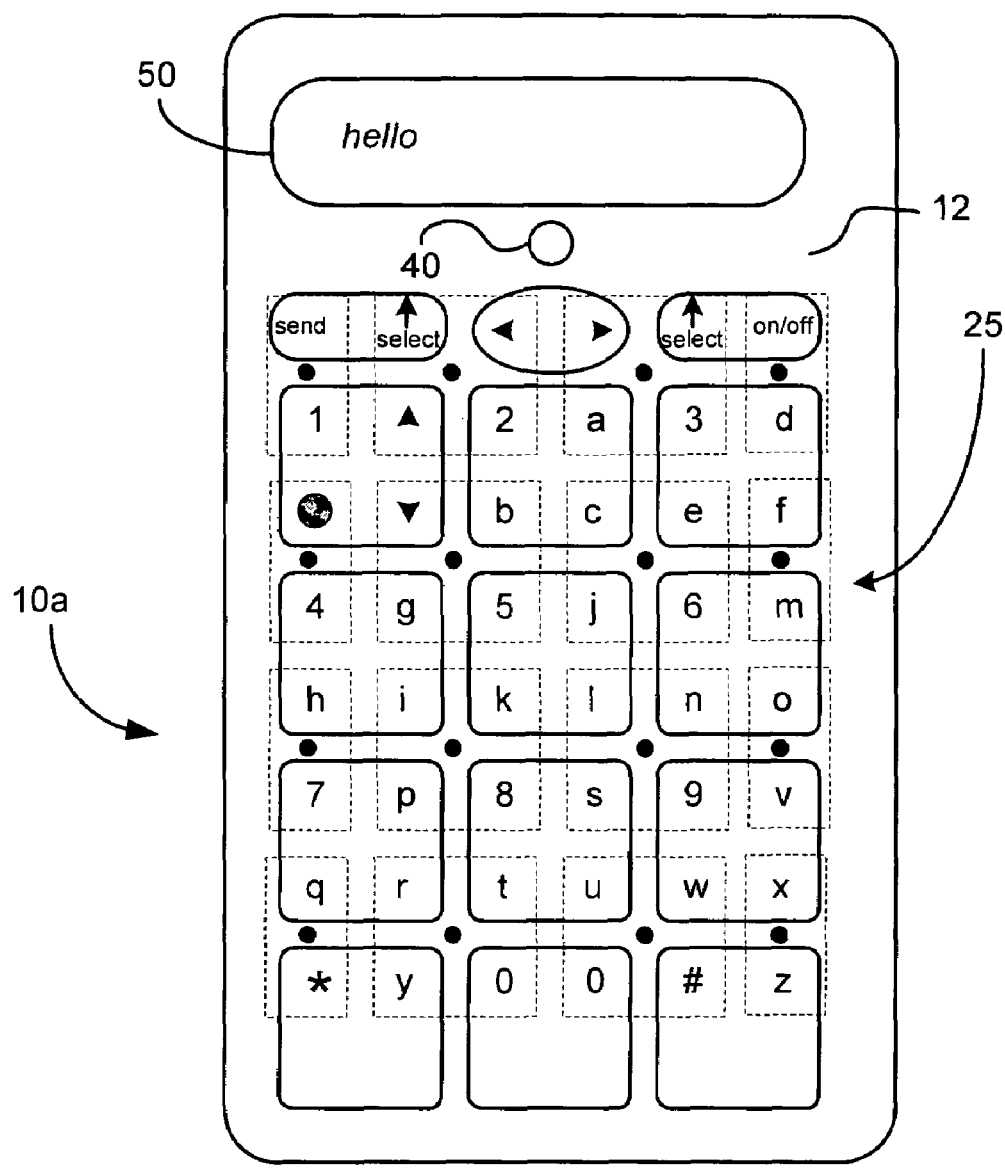
FIG. 5 is a schematic diagram of an exemplary electronic device according to another embodiment.
Figure 5:

In another embodiment, illustrated in FIG. 5, the accuracy with which the input value selection module 30 can determine the input value 22a is improved by defining a plurality of gaze areas 14 on the face 12 of the electronic device 10a. According to this embodiment, each defined gaze area 14 covers a portion of at least two data input keys 20, and preferably is associated with one input value in each of the at least two data input keys 20. Moreover, in this embodiment, input value selection module 30 can determine the input value 22a even when each input key 20 includes only one input sensor that is associated with multiple input values 202a assigned to the input key 20. The input sensor is activated when the associated input key 20 is pressed. The input sensor may be a simple momentary switch providing two binary values (0 or 1) or may be a pressure sensor as described above.

Figure 6:
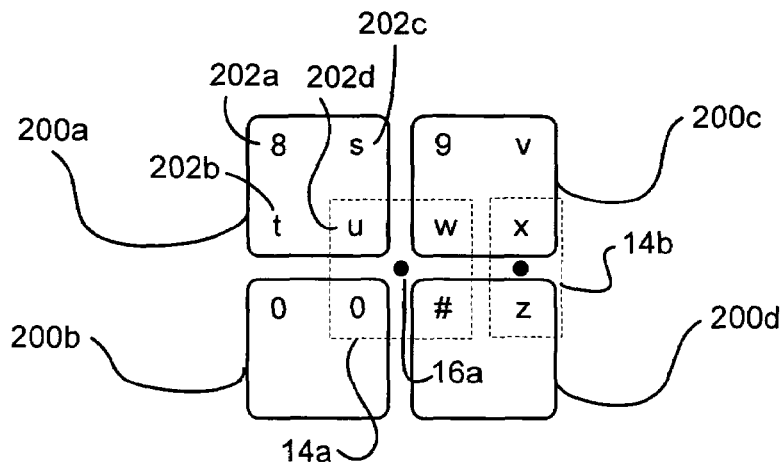
FIG. 6 is an illustration for a group of four (4) multi-value input keys according to an embodiment.

For example, FIG. 6 is an illustration for a group of four (4) multi-value input keys 200a-200d according to this embodiment of the present invention. As is shown, one gaze area 14a includes an area corresponding to one input value of each of the four (4) keys 200a-200d. Another gaze area 14b includes a different area corresponding to a different set of input values in each of two (2) keys 200c, 200d. The gaze areas 14a, 14b do not overlap, and therefore, any particular input value, e.g., 202d, is associated with only one gaze area 14a.

Referring again to FIG. 5, each gaze area 14 can also include a focal point 16, which is preferably near the center of the gaze area 14. The focal point 16 can be a feature, such as a dot, so that the user can focus on the point 16. Alternatively, the focal point 16 can be unmarked and merely defined as near or around the center of the gaze area 14. Other ways of designating a gaze area 14 and its focal point 16 are available as those skilled in the art would readily appreciate.

Referring again to FIG. 6, during data entry, the user can press the multi-value key, e.g., 200a, associated with the desired input value, e.g., 202d, while gazing at or near the focal point 16a associated with the gaze area 14a. The input value selection module 30 receives the key press data along with the eye-tracking information and determines which of the input values 202a-202d associated with the pressed key 200a was entered by selecting the input value 202d associated with the gaze area 14a.

Figure 7:
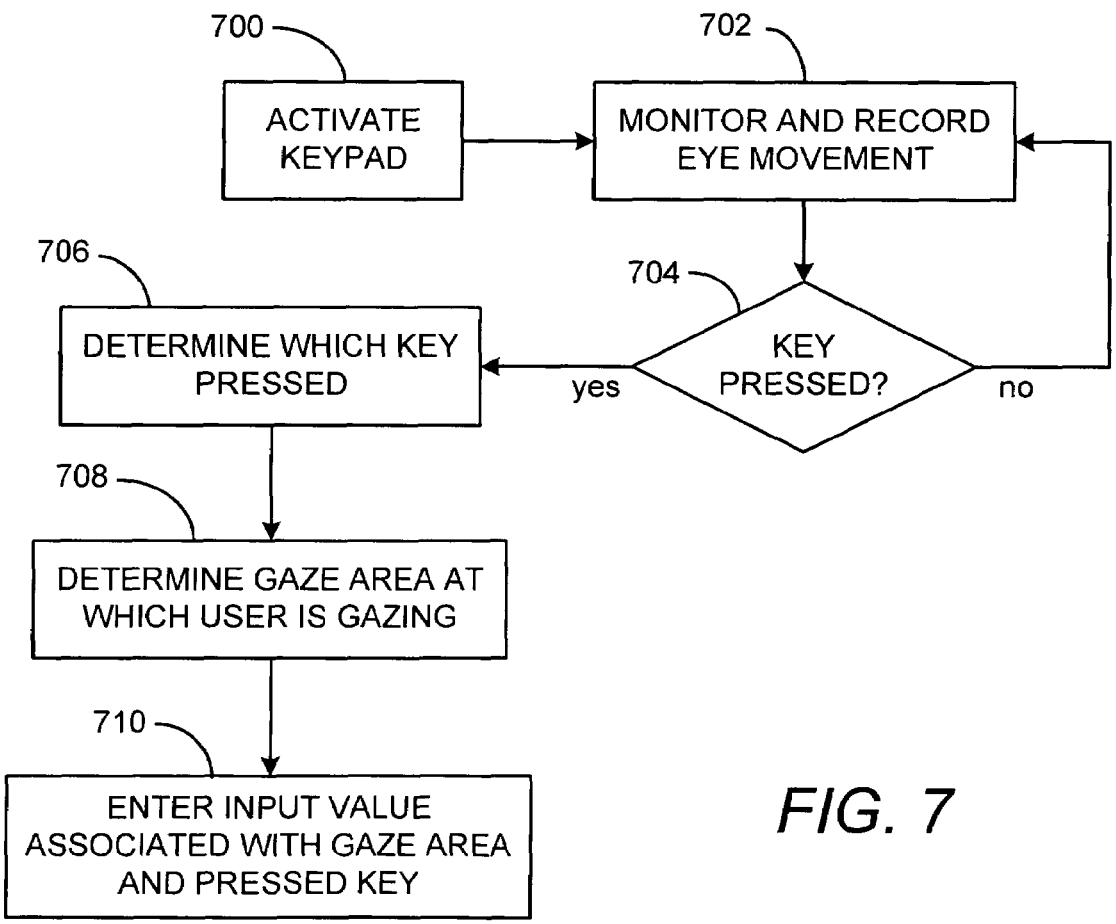
FIG. 7 is a flowchart illustrating a process for processing data entered at the electronic device according to the embodiment shown in FIGS. 5 and 6.

FIG. 7 is a flowchart illustrating a process for processing entered data using the electronic device 10 according to the embodiment shown in FIGS. 5 and 6. The process begins by activating the keypad 25 (step 700), for example, by unlocking the input keys 20 or by powering up the electronic device 10. The activation of the keypad 25 can also activate the eye-tracking system 40, which then monitors and records the user's eye movements (step 702). According to a preferred embodiment, the eye-tracking system 40 monitors and records, among other things, at which gaze area 14 the user is gazing and, optionally, an amount of time the user is gazing at a particular gaze area 14. Preferably, the user focuses on the focal point 16 of the gaze area 14 so that the eye-tracking system 40 can determine the gaze area 14 more accurately by increasing the margin for error.

When the user presses a multi-value key 200a (step 704) to enter a desired input value, e.g., 202d, the input value selection module 30 determines which input key 200a was pressed (step 706) and determines at which gaze area 14a the user is gazing (step 708) during a time period either immediately before and/or after the key 200a was pressed. The time period can be short such that the gazing action is substantially simultaneous with the key pressing event. On the other hand, the time period can be longer to ensure that the input value selection module 30 detects the correct gaze area 14a. Once the gaze area 14a and the pressed key 200a are determined, the input value selection module 30 displays the entered input value 202d associated with both the pressed key 200a and the gaze area 14a (step 710).

This embodiment also takes advantage of how the user intuitively enters data. That is, the user searches for the key 200a that is associated with the desired input value 202d and presses the key 200a while gazing at a designated focal point 16a near the desired input value 202d. The user can enter the desired input value 202d with a single tap and need not wait a prescribed time before entering another input value. Accordingly, this embodiment is also easy to use and provides fast data entry.

Although the embodiments described above each utilize a keypad 25, the principles described herein can also be used with a standard sized keyboard that includes multi-value keys. For example, in a typical QWERTY keyboard, the key associated with the input value "2" is also associated with the character "@." Utilizing the systems described herein, the user can enter the character "@" by gazing at the "@" and typing the key. In another example, foreign language keyboards often require the user to press a sequence of keys to enter a symbol. With the system of the present invention, the symbol can be associated with a key and can be entered with a single tap.

Moreover, the aspects described herein can also be combined with other letter prediction techniques, such as a word-based letter prediction technique that is based on a dictionary or an application-specific set of words. In this aspect, a word-based technique yields a probability W for a given letter, where the larger W is the more probable the given letter. The probability factor PF calculated by the input value selection module 30 can be combined with W to produce a combined probability weight CW. Depending on how PF and W are combined, either technique can be given priority. For example, let CW=PF×W. Here, both techniques are given equal priority. Alternatively, let $CW=(PF)^{1/n} \times W$. Here, the key-press-gaze technique is given higher priority than the word-based technique.

According to aspects described herein, single tap data entry is enabled by incorporating an eye-tracking system into an electronic device that has data input keys that are associated with two or more input values. The electronic device uses the eye-tracking system to determine where a user is gazing while the user presses a data input key. Based on the eye-tracking and key press data, the electronic device is able to determine which of the two or more input values associated with the pressed key was entered.

The present invention has been described in accordance with the embodiments shown, and one of ordinary skill in the art will readily recognize that there could be variations to the embodiments, and any variations would be within the spirit and scope of the present invention. Software written according to the present invention is to be stored in some form of computer-readable medium, such as memory, CD-ROM or transmitted over a network, and executed by a input value selection module. Consequently, a computer-readable medium is intended to include a computer readable signal which, for example, may be transmitted over a network. Accordingly, many modifications may be made by one of ordinary skill in the art without departing from the spirit and scope of the appended claims.

We claim:

1. An electronic device comprising:
   at least one multi-value key associated with at least two input data values, wherein each multi-value key includes a plurality of units and each input data value corresponds to at least one unit;
   an eye-tracking system for determining an area where a user is gazing by monitoring an eye movement of the user; and
   an input value selection module coupled to the plurality of units and to the eye-tracking system;
   a plurality of pressure sensors coupled to the input value selection module, wherein at least one pressure sensor is associated with each unit of the multi-value key and wherein each of the pressure sensors is configured to measure a pressure asserted on the associated unit of the multi-value key;
   wherein the input value selection module determines probabilistically which input data value was entered based on a value received from at least one unit and on an area where the user is gazing by concurrently analyzing the pressure measurements and the area at which the user is gazing to determine which input data value was entered by:
      assigning a pressure weight to each of the input data values associated with the multi-value key, the pressure weight corresponding to measured pressured asserted on the unit corresponding to the input data value;
      assigning a gaze weight to each of the input data values based on an amount of time that the area at which the user is gazing coincides with the unit corresponding to the input data value;
      combining the pressure weight and the gaze weight of each input data value; and
      entering the input data value based on the combined pressure and gaze weights.

2. The electronic device according to claim 1 wherein the area at which the user is gazing substantially coincides with a unit associated with an input data value.

3. The electronic device according to claim 1 wherein the electronic device is a hand held device.

4. The electronic device according to claim 3 wherein the handheld device is either a camera, a telephone, or a personal digital assistant.

5. An electronic device comprising:
   a plurality of data input keys, wherein each input key is associated with at least one input data value and at least one data input key is a multi-value key associated with at least two input data values, wherein each multi-value key includes a plurality of units and each input data value corresponds to at least one unit;
   an eye-tracking system for determining an area where a user is gazing by monitoring an eye movement of the user, wherein the eye-tracking system determines an area covering portions of at least two data input keys, at least one of which is a multi-value key;
   an input value selection module coupled to the plurality of data input keys and to the eye-tracking system;
   wherein the input value selection module determines which input data value was entered based on a manually pressed data input key and on the area where the user is gazing by:
      assigning a pressure weight to each input data value, the pressure weight corresponding to pressure asserted on the unit corresponding to the input data value;

assigning a gaze weight to each of the input data values based on an amount of time that the area at which the user is gazing coincides with the unit corresponding to the input data value combining the pressure weight and the gaze weight of each input data value; and determining which input data value was entered based on the combined pressure weight and gaze weight.

6. The electronic device according to claim 5 comprising a plurality of defined gaze areas, at least one gaze area overlapping at least two multi-value keys and associated with one input data value in each of at least two of the at least two multi-value keys.

7. The electronic device according to claim 6 further comprising a focal point for a user to focus on in the at least one gaze area overlapping at least two multi-value keys.

8. The electronic device according to claim 6 wherein each defined gaze area is associated with one input data value in each of a first and a second multi-value key.

9. The electronic device according to claim 6 wherein each defined gaze area is associated with one input data value in each of a first, a second, a third and a fourth multi-value key.

10. The electronic device according to claim 8 wherein the input value selection module enters the input data value that is associated with the gaze area and that is associated with the manually pressed multi-value key.

11. The electronic device according to claim 5 wherein the electronic device is a handheld device.

12. The electronic device according to claim 11 wherein the handheld device is either a camera, a telephone, or a personal digital assistant.

13. A method for processing data entered at an electronic device having at least one multi-value key associated with at least two input data values, the method comprising:

assigning a plurality of units to each multi-value key, wherein each input data value corresponds to at least one unit;

assigning at least one pressure sensor to each unit of the multi-value key, wherein each of the pressure sensors is configured to measure and quantify a pressure asserted on the associated unit of the multi-value key;

determining an area where a user is gazing by tracking the user's eye movement;

detecting a manual selection of a multi-value key; and determining probabilistically an input data value entered based on a value received from at least one unit and on the determined area where the user is gazing on the manually selected multi-value key by:

assigning a pressure weight to each of the input data values associated with the multi-value key, the pressure weight corresponding to measured pressured asserted on the unit corresponding to the input data value;

assigning a gaze weight to each of the input data values based on an amount of time that the area at which the user is gazing coincides with the unit corresponding to the input data value;

combining the pressure weight and the gaze weight of each input data value; and determining the input data value based on the combined pressure and gaze weights.

14. The method of claim 13 further comprising defining the area at which the user is gazing as substantially coinciding with a unit associated with an input data value.

15. A method for processing data entered at an electronic device having a plurality of data input keys, each data input key being associated with at least one input data value and at least one data input key being a multi-value key associated with at least two input data values, the method comprising:

determining an area where a user is gazing by tracking the user's eye movement, wherein the area covers portions of at least two data input keys, at least one of which is a multi-value key;

detecting a manual selection of a data input key; and determining which input data value was entered based on the manually pressed data input key and on the area where the user is gazing by:

assigning a pressure weight to each input data value, the pressure weight corresponding to pressure asserted on the unit corresponding to the input data value;

assigning a gaze weight to each of the input data values based on an amount of time that the area at which the user is gazing coincides with the unit corresponding to the input data value combining the pressure weight and the gaze weight of each input data value; and determining which input data value was entered based on the combined pressure weight and gaze weight.

16. The method of claim 15 further comprising defining a plurality of gaze areas, at least one gaze area overlapping at least two multi-value keys and associated with one input data value in each of at least two of the at least two multi-value keys.

17. The method of claim 16 wherein each defined gaze area is associated with one input data value in each of a first and a second multi-value key.

18. The electronic device according to claim 16 further comprising defining a focal point for a user to focus on in the at least one gaze area overlapping at least two multi-value keys.

19. The method of claim 17 wherein determining which input data value was entered includes identifying the input data value that is associated with the gaze area and that is associated with the manually pressed multi-value key.

20. A computer readable storage medium containing program instructions for entering data using an electronic device having a plurality of data input keys, wherein each data input key is associated with at least one input data value and at least one data input key is a multi-value key associated with at least two input data values, the computer readable medium comprising program instructions for:

determining an area where a user is gazing by tracking the user's eye movement, wherein the area covers portions of at least two data input keys, at least one of which is a multi-value key;

detecting a manual selection of a data input key; and determining which input data value was entered based on the manually pressed data input key and on the area where the user is gazing by:

assigning a pressure weight to each of the input data values associated with the multi-value key, the pressure weight corresponding to pressured asserted on the unit corresponding to the input data value;

assigning a gaze weight to each of the input data values based on an amount of time that the area at which the user is gazing coincides with the unit corresponding to the input data value;

combining the pressure weight and the gaze weight of each input data value; and determining the input data value based on the combined pressure and gaze weights.

21. A computer readable storage medium containing program instructions for entering data using an electronic device having at least one multi-value key associated with at least two input data values; the computer readable medium comprising program instructions for:
- assigning a plurality of units to each multi-value key, wherein each input data value corresponds to at least one unit;
- determining an area on at least one of the at least one multi-value key where a user is gazing by tracking the user's eye movement;
- detecting a manual selection of a multi-value key; and
- determining probabilistically which input data value was entered based on a value received from at least one unit and on the area where the user is gazing by:
  - assigning a pressure weight to each of the input data values associated with the multi-value key, the pressure weight corresponding to pressured asserted on the unit corresponding to the input data value;
  - assigning a gaze weight to each of the input data values based on an amount of time that the area at which the user is gazing coincides with the unit corresponding to the input data value;
  - combining the pressure weight and the gaze weight of each input data value; and
  - determining the input data value based on the combined pressure and gaze weights.

22. An electronic device comprising:
- at least one multi-value key associated with at least two input data values, wherein each multi-value key includes a plurality of units and each input data value corresponds to at least one unit;
- an eye-tracking system for determining an area on at least one of the at least one multi-value key where a user is gazing by monitoring an eye movement of the user; and
- an input value selection module coupled to the plurality of units and to the eye-tracking system;
- wherein the input value selection module determines probabilistically which input data value was entered based on a value received from at least one unit and on the area where the user is gazing by:
  - assigning a pressure weight to each of the input data values associated with the multi-value key, the pressure weight corresponding to pressured asserted on the unit corresponding to the input data value;
  - assigning a gaze weight to each of the input data values based on an amount of time that the area at which the user is gazing coincides with the unit corresponding to the input data value;
  - combining the pressure weight and the gaze weight of each input data value; and
  - determining the input data value based on the combined pressure and gaze weights.

23. The electronic device according to claim 22 further comprising:
- a plurality of pressure sensors coupled to the input value selection module, wherein at least one pressure sensor is associated with each unit of the multi-value key and wherein each of the pressure sensors is configured to measure a pressure asserted on the associated unit of the multi-value key;
- wherein the input value selection module concurrently analyzes the pressure measurements and the area at which the user is gazing to determine which input data value was entered.

* * * * *